US011100130B2

(12) United States Patent
Natanzon et al.

(10) Patent No.: US 11,100,130 B2
(45) Date of Patent: Aug. 24, 2021

(54) CONTINUOUS REPLICATION AND GRANULAR APPLICATION LEVEL REPLICATION

(71) Applicant: EMC IP Holding Company LLC, Hopkinton, MA (US)

(72) Inventors: Assaf Natanzon, Tel Aviv (IL); Luay Al-Alem, Lynnfield, MA (US); Antony Bett, Shrewsbury, MA (US); Michael Rhodes, Stamford, CT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 502 days.

(21) Appl. No.: 16/053,953

(22) Filed: Aug. 3, 2018

(65) Prior Publication Data
US 2020/0042632 A1  Feb. 6, 2020

(51) Int. Cl.
*G06F 16/27* (2019.01)
*G06F 11/14* (2006.01)
*G06F 11/16* (2006.01)
*G06F 9/50* (2006.01)

(52) U.S. Cl.
CPC ............. *G06F 16/27* (2019.01); *G06F 9/50* (2013.01); *G06F 11/1464* (2013.01); *G06F 11/1662* (2013.01); *G06F 2201/80* (2013.01); *G06F 2201/815* (2013.01); *G06F 2201/84* (2013.01)

(58) Field of Classification Search
CPC ..... G06F 9/50; G06F 11/1464; G06F 11/1662
See application file for complete search history.

(56) References Cited

U.S. PATENT DOCUMENTS

| | | | |
|---|---|---|---|
| 9,305,009 B1 * | 4/2016 | Bono | G06F 16/178 |
| 2017/0078387 A1 * | 3/2017 | Xu | H04L 12/1886 |
| 2019/0065323 A1 * | 2/2019 | Dhamdhere | G06F 9/455 |

* cited by examiner

*Primary Examiner* — Dong U Kim
(74) *Attorney, Agent, or Firm* — Workman Nydegger

(57) ABSTRACT

A containerized environment and application that are configured for component specific continuous replication and granular application level application. A key value store, which stores key values related to configuration data of the containerized application, is replicated continuously to a replicated key value store at a replica site. Persistent volumes may also be replicated to a replica site. The replication can be performed to multiple replica sites in an application specific manner.

19 Claims, 4 Drawing Sheets

CONTINUOUS REPLICATION AND GRANULAR APPLICATION LEVEL REPLICATION

FIELD OF THE INVENTION

Embodiments of the present invention relate to systems and methods for performing data protection operations. More particularly, embodiments of the invention relate to systems and methods for continuous and/or granular application replication.

BACKGROUND

The manner in which applications are developed and deployed is constantly evolving. Currently, some applications are developed and deployed using containers. Containerized applications provide a number of advantages. Containers can be updated and scaled easily. In fact, containerized applications are updated frequently. Further, it is possible to update portions or specific containers independently of other portions of the application. As a result, protecting a containerized application (e.g., backing up the application) becomes much more difficult.

For example, containerized applications often rely on a key value store (e.g., Kubernetes relies on an ETCD). This key value store typically stores configuration data that can be used by all nodes associated with the application. Current data protection systems, however, typically have a system wide granularity, which is often insufficient. In addition, periodic backups of the key value store may be insufficient at least because the key value store changes frequently. Systems and methods are needed to improve data protection systems for applications including containerized applications.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to data protection systems and methods. Data operations performed by data protection systems include backup operations, restore operations, replication operations, de-duplication operations, or the like or combination thereof. Embodiments of the invention further relate to systems and methods for continual or granular replication of applications or components thereof.

Embodiments of the invention further relate, by way of example, to systems and methods for continually and/or granularly replicating container based applications or portions thereof. By way of example, a container may be a packaged piece of software that includes everything needed to run. This may include code, runtime, system tools, libraries, settings, and the like.

Figure 1:
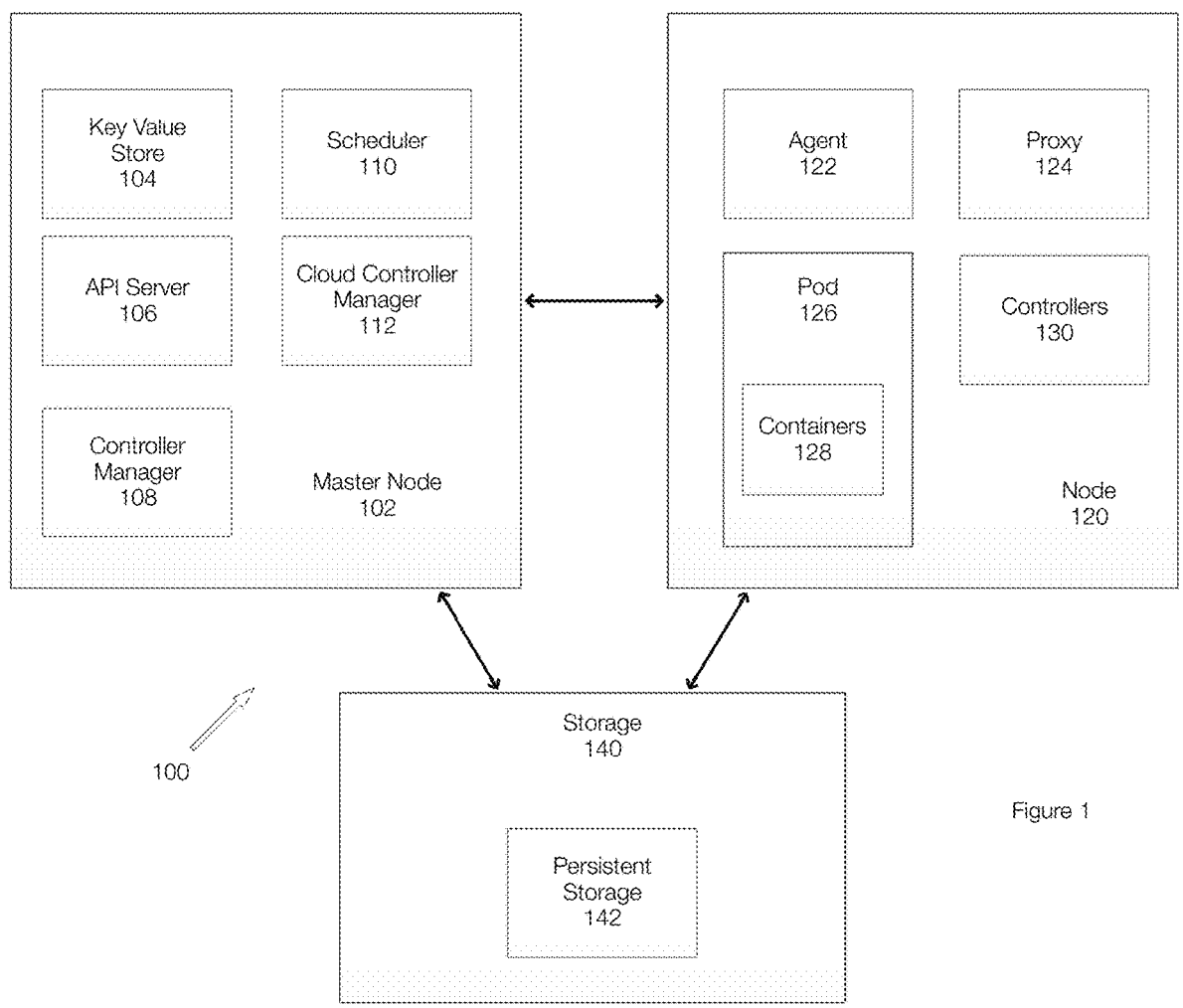
FIG. 1 illustrates an example of a container platform suitable for containerized applications.

A container platform is often used for containerized applications. A container platform is capable of orchestrating or managing container operations or containerized workloads and services. The container platform may orchestrate computing, networking, and storage infrastructure on behalf of user workloads. A container platform can simplify platform as a service (PaaS) and infrastructure as a service (IaaS) and enables portability across different infrastructures. Kubernetes (see https://kubernetes.io, which is incorporated by reference) is an example of a platform that automates or orchestrates container operations. The container platform may be configured to manage or control containerized applications that are deployed across multiple hosts, scale FIG. 1 illustrates an example of a container platform that is configured to schedule and run containerized applications on clusters. The clusters may include physical and/or virtual machines. The container platform may orchestrate computing, networking, and storage infrastructure on behalf of user workloads.

The container platform 100 shown in FIG. 1 may include a master node 102, a node 120 (representative of a plurality of nodes or of a cluster of nodes), and storage 140. Applications running in the container platform 100 may include containers, microservices, back end services, access points (APIs) or the like.

The master node 102, which may be present on a single node or spread across a plurality of nodes, may include by way of example various components. These components may include a key value store 104, a scheduler 110, an API server 106, a controller manager 108 and a cloud controller manager 112. T The components of the master node 102 are configured to provide a control plane and make decisions related to the cluster. The master node 102 may make decisions regarding scheduling, detecting and responding to cluster events, or the like.

Master components provide the cluster's control plane. Master components make global decisions about the cluster (for example, scheduling), and detecting and responding to cluster events (starting up a new pod when a replication controller's 'replicas' field is unsatisfied).

The key value store 104 is a component of the container platform that stores cluster data. For example, the key value store 104 may store configuration data that can be used by each of the nodes in the cluster. The key value store 104 can be used for service discovery and represents the state of the cluster. Each component of the container platform can reference the key value store 104 to configure or reconfigure themselves. The key value store 104 may be accessed by, for example, a HTTP/JSON API. Thus, the key value store 104 is associated with an interface that allows values stored in the key value store 104 to be accessed or set as required. The key value store 104 may be stored as a single master node or distributed among a number of master nodes or machines. The key value store 104 is typically available to each node in the cluster.

The API server 106 is typically configured to expose an API for the container platform 100. The API server 106 functions as a front-end and allows a user to configure workloads and organizational units operating in the container platform 100. The API server 106 may also be responsible for ensuring that the key value store 104 and the service details of deployed containers are in agreement. The API server 106 acts as a bridge between various components to maintain cluster health and disseminate information and commands.

The API server 106 implements an interface (e.g., a RESTful interface), which allows many different tools and libraries to communicate with the API server 106. A client may be used from a local computer to interact with the container platform 100.

The controller manager 108 is configured to run various controllers. A node controller, for example, is responsible for detecting and responding to node events, such as when a node fails or goes down. A replication controller is configured to maintain a correct number of pods for every replication controller object in the container platform 100. An endpoint controller is configured to populate endpoint objects, for example joining services and pods. A service account and token controller is configured to create accounts and API access tokens for new namespaces.

The details of these operations are written to the key value store 104. The controller manager 108 watches for these changes through the API server 106. When a change is detected or seen, the controller manager 108 (or relevant controller) reads the new information in the key value store 104 and implements a procedure to fulfill the desired state. This may include, for example, scaling an application, adjusting endpoints, or the like.

The scheduler 110 is a component may be configured to select a node on which newly created pods should run. For example, the scheduler 110 may account for a service's operating requirements and the current infrastructure and then place the work or the new pods on an acceptable node or nodes. The scheduler 110, when making scheduling decisions, may account for various factors such as individual and collective resource requirements, hardware/software/policy constraints, affinity and anti-affinity specifications, data locality, inter-workload interference and deadlines.

The cloud controller manager 112 may operate as a daemon and may embed cloud-specific control loops. The cloud manager 112 may allow the code of cloud vendors and the code of the container platform 100 to evolve independently of each other.

Some controllers may have dependencies on the cloud provider in which the container platform 100 is implemented. A node controller is configured to check the cloud provider to determine if a node has been deleted in the cloud after the node stops responding. A route controller is configured to set up routes in the cloud infrastructure. The service controller is configured to create, update, and delete cloud provider load balancers. A volume controller is configured to create, attach, and mount volumes. The volume controller may interface with the cloud provider to orchestrate cloud volumes.

FIG. 1 also illustrates a node 120, which is representative of multiple nodes. The node 120, and others similarly configured, perform work in the cluster. The node may include components that are substantially present on all of the node sin the cluster.

The node 120 may provide a container runtime, which is software responsible for running containers. The node 120 may also include or be associated with an agent 122. The agent 122 typically runs on each node in the cluster and ensures that containers 128 are running in a pod 126. The agent 122 may relay information to and from the control plane (the components on the master node 102). The agent 122, for example, may interact with the key value store 104 to read configuration details or write new values. The agent 122 may communicate with the components on the master node 102 to receive commands and to perform work. The work is often received in a form that defines the workload and the operating parameters. The agent 122 may also assume responsibility for maintaining the state of the work on the node 120.

The proxy 124 may be configured to maintain network rules on the node 120 and perform connection forwarding. For example, the proxy 124 may forward requests to the correct containers, perform some load balancing, and may ensure that the networking environment is predictable and isolated.

The pod 126 may be used to deploy an application. The pod 126 may represent a running process, for example. In this example, the pod 126 encapsulates one or more containers 128, storage resources, a unique network IP, and options that govern how the container(s) should run.

The pod 126 represent a unit of deployment or a single instance of an application. Thus, a single instance of an application may include a single container or a small number of containers that are highly related and that share resources. As a result of these relationships, the containers are typically scheduled on the same node. The containers 128 of the pod 126 are managed as a unit. More specifically, the containers 128 may share volumes and IP space. The containers 128 can be deployed and scaled as a single application. For example, the pod 126 may include a main container that satisfies the general purpose of the pod, and optionally some helper containers that facilitate related tasks. These are programs that benefit from being run and managed in their own container, but are heavily tied to the main application.

The node 120 is also associated with controllers 130. A replication controller, for example, ensures that that a specified number of pod replicas are running at any one time. In other words, the replication controller ensures that a pod or a homogeneous set of pods is always up and available in the cluster.

A deployment controller provides declarative updates for pods. The deployment controller changes the actual state to a desired state at a controlled rate. A stateful set controller may update a stateful set object, which defines a desired state. A daemon set control ensures that all or some nodes run a copy of a pod. When nodes are added to the cluster, pods are added to the new nodes. As nodes are removed from the cluster, the pods are cleaned up or garbage collection is performed. Deleting a daemon set, for example, will clean up the pods created by the daemon set. A garbage collection controller may delete object that no longer have an owner.

A job controller creates one or more pods and ensures that a specified number of the pods successfully terminate. As pods successfully complete a job, the job controller tracks the successful completions. When a specified number of successful completions is reached, the job itself is complete. Deleting a job will clean up the pods it created.

The container platform may also provide services such as load balancing and networking. A service in a container platform may define a logical set of pods and a policy by which the set of pods are accessed—for example a micro service.

In one example, a service may act as a basic load balance and ambassador for other containers. A service may group together logical collections of pods that perform the same function to present them as a single entity. This allows a service unit that is aware of all of the backend containers to pass traffic to to be deployed. External applications only need to worry about a single access point, but benefit from a scalable backend or at least a backend that can be swapped out when necessary. A service's IP address remains stable, abstracting any changes to the pod IP addresses that can happen as nodes die or pods are rescheduled. Services are an interface to a group of containers so that consumers do not have to worry about anything beyond a single access location. By deploying a service, discover-ability is gained and container design is simplified.

FIG. 1 also illustrates storage 140. The storage 140 is associated with the cluster (e.g., the node and the master node) and may include distinct storage devices. For example, each node may be associated with its own storage. However, managing storage is distinct from managing compute.

Managing storage is a distinct problem from managing compute. The container platform may abstract the manner in which storage is provided and the manner in which storage is consumed. In FIG. 1, the persistent storage 142 represents storage in the cluster that has been provisioned by an administrator. More specifically, a persistent volume is a resource in the cluster. Similarly, the node is a cluster resource. Persistent volumes may be implemented as plug ins. In one example, a persistent volume may have a lifecycle independent of any individual pod that uses the persistent volume. The storage 140 including the persistent storage 142 may be, by way of example only, NFS, iSCSI, or a cloud-provider-specific storage system.

A user may make a request for storage. The request for storage is similar to a pod. A pod may consume node resources and requests may consume persistent storage or persistent volumes. Pods can request specific levels of resources (CPU and Memory). Requests can request specific sizes and access modes (e.g., can be mounted once read/write or many times read-only).

While persistent volume requests allow a user to consume storage abstract storage, embodiments of the invention allow for persistent volumes with varying properties, such as performance. In addition to different sizes and access modes, persistent volumes are offers that over varying properties such as performance.

In order to backup up a container platform system (e.g., a Kubernetes system) or an application running therein, there is a need to restore all of the persistent components of the system. This includes the key value store and all persistent volumes of all pods that are to be protected.

Embodiments of the invention thus relate to a replication operation in the container application. In one example, embodiments of the invention relate to a continuous application level replication of the key value storage (e.g., ETCD in Kubernetes). Embodiments of the invention relate to replicating persistent volumes as well.

Figure 2:
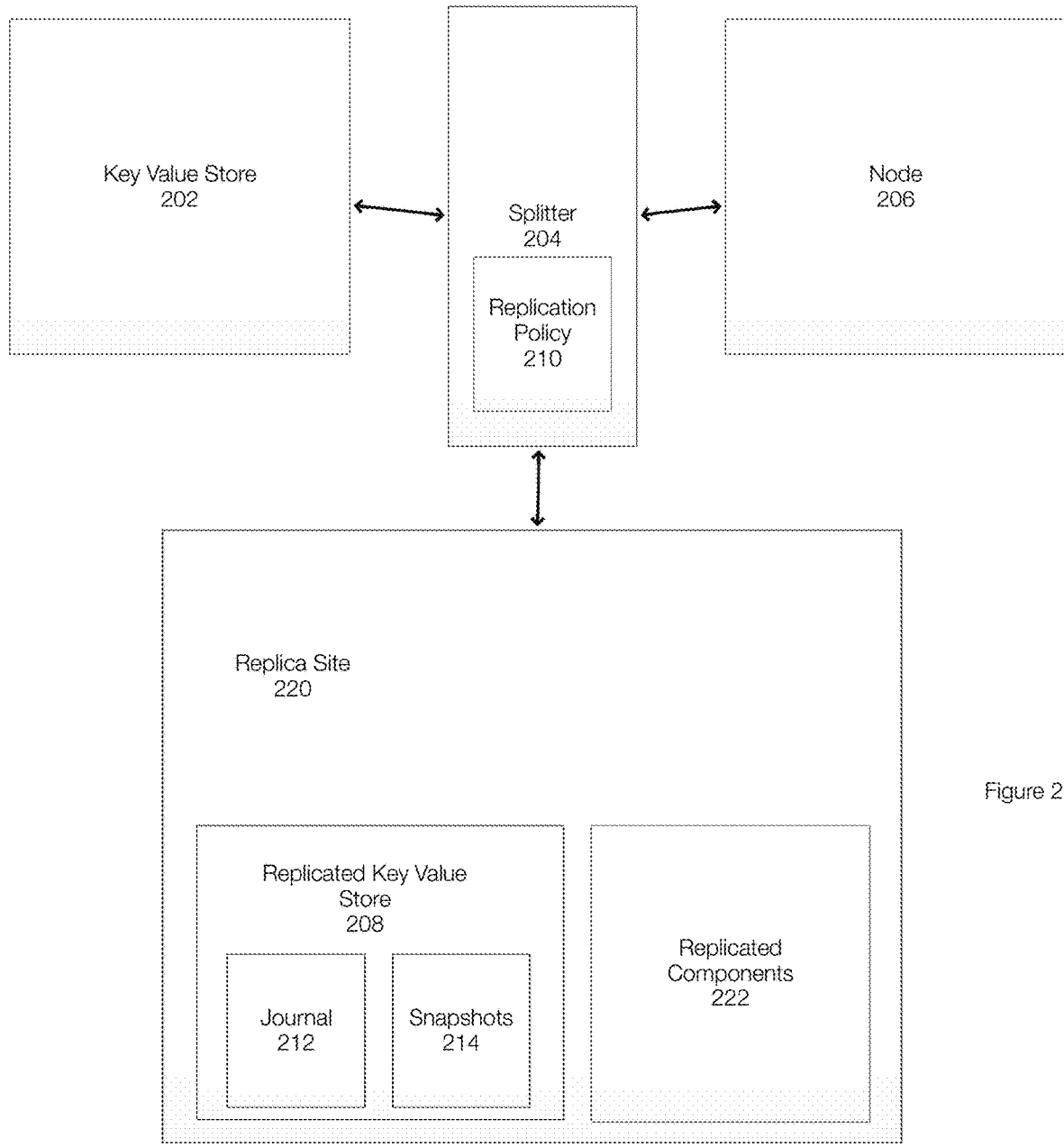
FIG. 2 illustrates an example of a data protection system configured to replicate a component of an application or of a container platform.

The key value store 104 allows various operations that may include, by way of example:

Setting the value of a key
Get the value of a key
Changing the value of a key
Deleting a key
Using key TTL (have a key expiry time)
Refreshing key TTL
Waiting for a change
Atomically Creating In-Order Keys
Using a directory TTL
Atomic Compare-and-Swap
Atomic Compare-and-Delete
Creating Directories
Listing a directory
Deleting a Directory
Creating a hidden node (item which will not be shown when listing directory)
Setting a key from a file
Read Linearization FIG. 2 illustrates an example of systems and methods for replicating a component of a container platform such as a key store value. FIG. 2 illustrates a node 206 that may communicate with a key value store 202. Other components of the container platform and/or containerized application may communicate with the key value store 202.

In this example, a splitter 204 is provided. The splitter 204 is configured such that communications with the key value store 202 pass through, are intercepted by, or are evaluated by the splitter 204. In one example, the splitter 204 may be integrated into the key value store 202. The splitter 204 may intercept commands arriving at the key value store 202. The splitter 204 may filter commands based on a replication policy 210.

The replication policy 210 may determine how the commands are handled by the splitter 204. For example, read commands that do not change key values stored in the key value store 202 may be ignored by the splitter 204. For example, "Get the value of a key" or "Listing a directory" do not get persisted so they can be ignored.

In one embodiment, the splitter 204 transmits the intercepted commands and/or key values associated with the commands to a replicated key value store 208 at a replica site 220. This allows synchronous or near synchronous replication of the key value store 202. In one example, the replicated key value store 208 may mirror the key value store 202. In another example, the intercepted commands are written to a journal 212 such that the commands can be applied in the same order to the replicated key value store 208 as the commands were applied to the key value store 202.

Snapshots 214 of the key value store 202 and/or the replicated key value store 208 may be taken at various points in time and a redo log of all operations to the key value store 202 may be kept. In one example, the snapshots 214 may be taken of the replicated key value store 208, which would correspond to snapshots of the key value store 202. The snapshots 214 may also include the journal 212.

The snapshots 214 allow the key value store 202 to be restored to specific points in time. For example, to restore the key value store 202 to a time C that is between time A and time B, a snapshot corresponding to time A is restored and the actions in the journal 212 or in the redo log are applied. More generally, the snapshot of the key value store 202 before the point in time is restored and actions in the journal are applied up to the desired point in time.

In another example, the replication policy 210 may allow selective replication of keys or values in the key value store 202. This also allows an application running in one cluster to be restored to another cluster. More specifically, the keys or values stored in the key value store 202 can be divided into two types: General keys and Application specific keys. General keys may relate to the environment and application specific keys describe values relevant to a single application.

In this example, replicating the key value store may ignore general keys that are not relevant for a restore operation and only replicate keys needed for a restore operation. Important keys can be detected using specific names, prefixes, or directories. The name or label of an application can be used to identify keys needed for a restore operation.

The general keys may be kept in a first journal and the application keys are kept in a second journal. Each application may be associated with a particular journal. Thus, there may be many journals or many second journals. Thus, the general keys are kept in a separate journal than the application specific keys. The user is able to select which applications are protected and the target site of each application. When moving or restoring a particular application, the journal for the application specific keys can be used.

The splitter 204 may also support multiple sites or multiple replication sties. Each site will receive all of the general keys and keep them in a corresponding general key journal. Alternatively, the general keys may be replicated to all sites and available to all supported replication sites. The application specific keys are replicated, in one example, only for protected applications and only to the sites that have a copy of the application. In one example, for each application, the key value operation related to the application will be kept in a key value journal that is specific to the application.

Restoring a key value store is an operation that can be performed on a node or on a replica site. Initially, the restore operation may understand which applications are being restored (e.g., based on user input). In this case, all of the general keys from the general key journal are applied to an empty key value store. Next, the key values for all of the applications being restored will be applied to the key value store.

Embodiments of the invention further relate to replicating a containerized application at an application level. The replication system allows the application to be mark the application as replicated and also mark the replication site. The data protection system may detect the persistent volumes that belong to the application and replicate the persistent volumes to the replicated site. In addition to the persistent volume, the general keys or values of the key value store are replicated to the replica site and all application specific keys for the application being replicated are also replicated to the replica site. Advantageously, different applications can be replicated to different sites. A marked key or application, for example, is replicated.

More generally, FIG. 2 illustrates that that the replicated key value store 202 may be stored as a replicated key value store 208 at a replica site 220. The replica site may be a node of the cluster or storage at another location (e.g., a datacenter or cloud storage). FIG. 2 illustrates that the replica site 220 may also store replicated components 222. The replicated components 222 may include a persistent volume or the container binary. In one example, the persistent volume and the container binary may not be replicated like the key value store 202. More specifically, the key value store 202 is replicated such that the replicated key value store 208 is synchronous or nearly synchronous with the key value store 202. Rather, the persistent volume or volumes associated with the application and the container binary can be replicated or backed up using snapshots or the like. This helps ensure, as discussed herein, that continuous replication of the key value store 202 and at least granular application level replication of other components including, but not limited to, the application's persistent volumes and container binary. In one example, the container binary is essentially a copy of the container. Further, to the extent that an application includes a pod of containers or multiple containers, each container or pod can be replicated or backed up as discussed herein.

Figure 3:
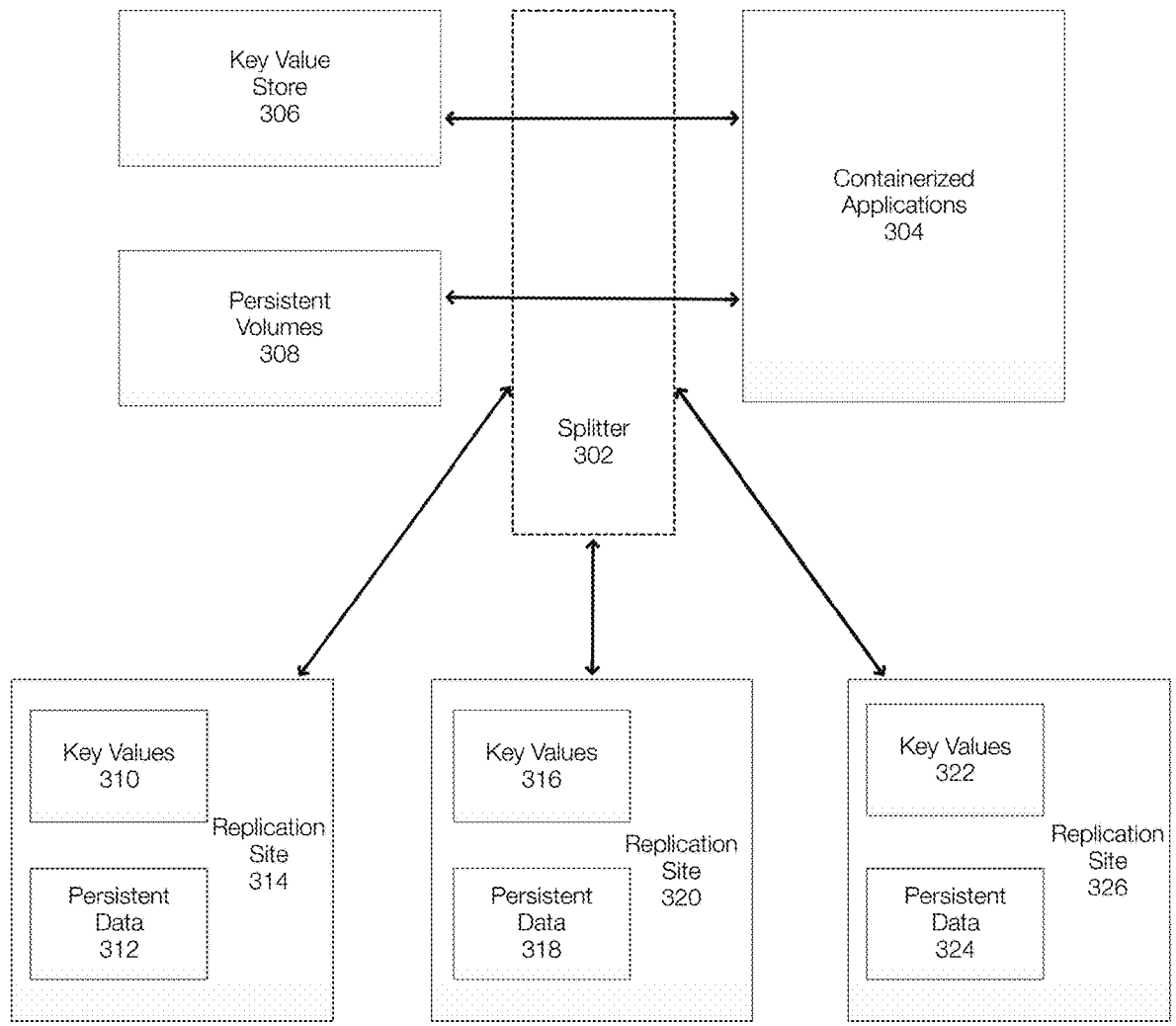
FIG. 3 illustrates an example of continuous replication of a key value store and/or granular application level replication of a containerized application.

FIG. 3 illustrates an example of continuous replication of a key value store and/or granular application level replication of a containerized application. In this example, containerized applications 304 may operate in a containerized environment or platform. A splitter 302 may intercept commands directed to the key value store 306 and replicate to one of the replica sites (replication sites) 314, 230 or 326. More specifically, FIG. 3 illustrates that applications can be replicated in an application specific manner. When an application and/or application specific keys are marked for replication, they may be replicated. Thus, keys associated with a first containerized application may be replicated to site 314. Second and third containerized applications may be replicated to, respectively, sites 320 and 326.

More specifically, the key values 310 may store all general keys for the containerized platform or for multiple containerized applications. The key values 310 may contain application specific keys for only a single application. The key values 316 and 322 are similarly configured. The replication sites may also use journals for the keys as previously described.

The persistent data 312 corresponds to the persistent volumes of a particular application. The persistent data 318 and 324 are similarly configured. Thus, the replication systems discussed herein can replicate on a continuous manner and a granular manner to multiple sites at the same time. Each replica site may be associated with a particular application or with a plurality of closely related applications. In one example, the application does not need to be replicated in a continuous manner. Rather, any form of replication or backup can be used. In one example, however, the application may be backed up any time an event occurs (e.g. a container is updated, a failure occurs, according to a schedule, etc.). As previously stated, the binary of the containers may be copied to the replication site.

As a result, an application from the replication site 314 can be restored to the same cluster or to a different cluster. Alternatively, if a node in the cluster that supports a particular application fails, that application can be restored from the corresponding replica site.

FIG. 3 further illustrates that the persistent volumes 308 may be replicated in a similar manner. Data written to the persistent volumes 308 may be replicated in an application specific manner. Alternatively, the persistent volumes 308 can be replicated to a replicated persistent volumes.

Figure 4:
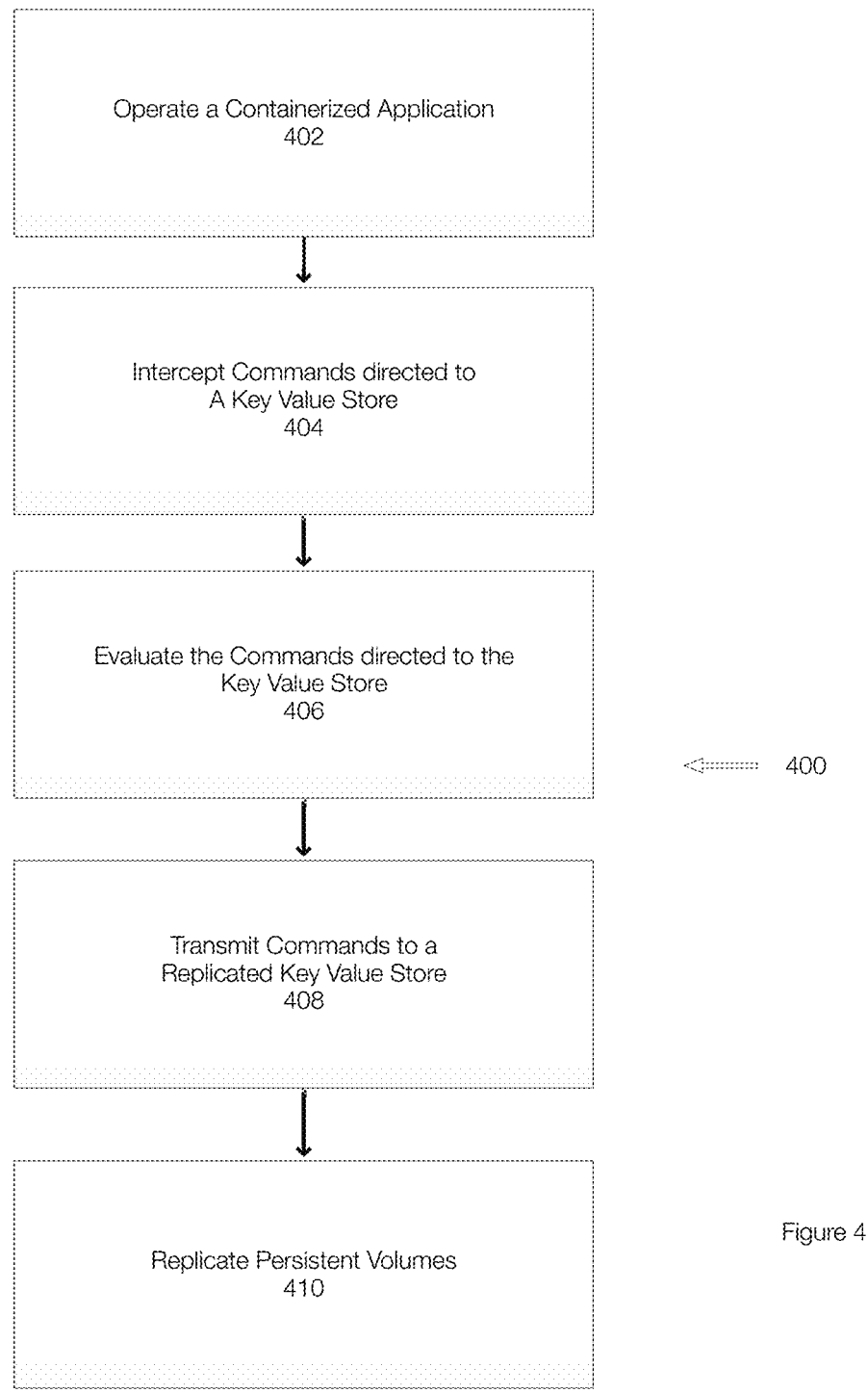
FIG. 4 is an example of a method for replicating a containerized application.

FIG. 4 is an example of a method for replicating a containerized application. The method of FIG. 4 may begin by operating 402 a containerized application in a containerized platform or environment. The method 400 may assume that the application is already operating or running Commands directed to a key value store are intercepted 404. In one example, the commands are simply forwarded or transmitted 408 to a replica site or to a replicated key value store.

In another example, the commands are evaluated 406. Commands that do not change key values in the key value store (e.g., read, list, etc.) can be ignored. Commands that change values are transmitted 408 to the replicated key value store.

Because the command typically includes the new value of the key value, the replicated key value store effectively mirrors the key value store. The continuous replication of the key value store allows for faster recovery and thus better functioning of the computing system. As previously stated, transmitting 408 the commands can be done in an application specific manner to multiple replica sites.

During a restore operation, it may be necessary to establish a containerized platform or suitable environment. Thus, the platform may include a key value store that is empty. When restoring from a single replica site, the key values are simply written to the new key value store. Alternatively, the general key values can be written first and be followed by the application specific keys. Because snapshots are available, the key value store can be restored to a selected point in time by restoring a snapshot and then applying the relevant portions of the key value journals. A replicated persistent volume may also be restored. Other components of the containerized application can be instantiated or started as needed. For example, the containers can be copied to the various nodes and other components of the containerized platform can be put into place and execution can begin.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating a containerized application, the method comprising:
    operating the containerized application in a container platform, wherein the container platform includes a master node and a plurality of nodes, wherein the master node is associated with a key value store that is available to the master node and the plurality of nodes, wherein the key value store stores key values, wherein the key values for the containerized application are stored in the key value store and wherein the key values include configuration data associated with the container platform and a state associated with the container platform;
    intercepting a command from a component of a containerized application that is directed to the key value store;
    performing the command in the key value store;
    sending the command to a replicated key value store at a replica site, wherein the command is applied at the replicated key value store; and
    replicating volumes associated with the containerized application and a container binary associated with the containerized application to the replica site,
    wherein the replicated key value store is configured to be restored in a manner that is consistent with the replicated volumes.

2. The method of claim 1, further comprising sending the command to the replicated key value store only when the command changes a key value stored in the key value store.

3. The method of claim 1, further comprising storing the command at a journal at the replicated key value store.

4. The method of claim 3, further comprising applying commands in the journal to the replicated key value store in an order in which the commands were received at the replicated key value store.

5. The method of claim 1, further comprising sending only general commands and application specific commands associated with the containerized application to the replicated key value store.

6. The method of claim 5, further comprising sending general commands to a general journal at the replicated key value store and sending the application specific commands to an application specific journal at the replicated key value store.

7. The method of claim 1, further comprising taking snapshots of the replicated key value store.

8. The method of claim 1, further comprising a plurality of replica sites, each replica site associated with a particular application or applications, the method further comprising sending commands associated with general keys to each of the plurality of replica sites and sending application specific commands to corresponding replica site.

9. The method of claim 1, further comprising replicating persistent volumes to the replica site.

10. The method of claim 1, further comprising restoring the containerized application using the replicated key value store and persistent volume data that has been replicated to the replica site.

11. The method of claim 1, further comprising replicating a binary of the containerized application to the replica site.

12. A method for replicating a containerized application, the method comprising:
    operating the containerized application in a container platform, wherein the container platform includes a master node and a plurality of nodes, wherein the master node is associated with a key value store that is available to the master node and the plurality of nodes, wherein the key value store stores key values;
    configuring a splitter to operate in conjunction with the key value store;
    evaluating commands transmitted to the key value store, wherein commands configured to read a value from the key value store are ignored;
    transmitting commands that change a key value to a replicated key value store at a replica site, wherein the splitter is configured to transmit general commands to a plurality of replica sites, each replica site associated with an application, and wherein the splitter is configured to transmit application specific commands to a corresponding replica site; and
    applying the commands transmitted to the corresponding replicated key value store.

13. The method of claim 12, further comprising storing the commands transmitted to the replicated key value store in a journal.

14. The method of claim 13, further comprising applying commands transmitted to the replicated key value store and stored in the journal to the replicated key value store in an order in which the commands were received at the replicated key value store.

15. The method of claim 12, further comprising taking snapshots of the replicated key value store.

16. The method of claim 12, further comprising replicating persistent volumes to the replica site.

17. The method of claim 12, wherein the key value store is replicated continuously and wherein the containerized application is replicated at an application level.

18. A method for restoring a containerized application in a container platform, the method comprising:
    identifying a replica site that includes the containerized application being restored;
    retrieving general keys from a replicated key value store and applying the general keys to a key value store of the containerized application being restored;
    retrieving application specific keys from the replicated key value store and applying the application specific keys to the key value store of the containerized application being restored, wherein the general keys and the application specific keys include configuration data associated with the container platform and a state associated with the container platform;
    restoring a persistent volume from a replicated persistent volume stored at the replica site;
    instantiating components of a containerized environment and/or of the containerized application being restored, the components including a master node associated with the key value store and a node, the node associated with containers, an agent, and controllers; and
    restoring the key value store to be consistent with the containerized application being restored.

19. The method of claim 18, wherein the replica site allows for application level replication and continuous replication of the key value store.

* * * * *